June 17, 1924.

A. GORDOS

AUTOMOBILE LAMP

Filed July 12, 1923

Inventor
A. Gordos
By J.K. Bryant
Attorney

Patented June 17, 1924.

1,498,165

UNITED STATES PATENT OFFICE.

ARPAD GORDOS, OF ISELIN, PENNSYLVANIA.

AUTOMOBILE LAMP.

Application filed July 12, 1923. Serial No. 651,061.

*To all whom it may concern:*

Be it known that I, ARPAD GORDOS, a citizen of the United States of America, residing at Iselin, in the county of Indiana and State of Pennsylvania, have invented certain new and useful Improvements in Automobile Lamps, of which the following is a specification.

This invention relates to new and useful improvements in automobile lamps of the type best adapted to be employed as headlights.

An important object of the invention is to provide an automobile headlight with adjustable means for directing the projected rays of light downwardly upon the roadbed to prevent approaching pedestrians and drivers from being blinded by the glare of the lights.

A further object of the invention is to provide a device of the above mentioned character which may be easily applied to many standard forms of automobile headlights without materially altering the construction of the same.

Other objects and advantages of the invention will be apparent during the course of the following description.

Figure 1:
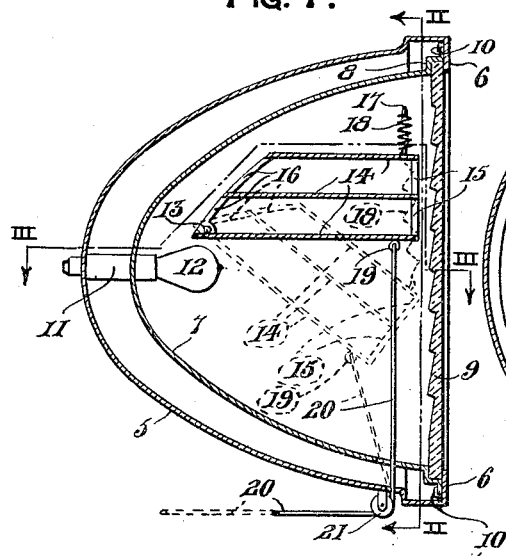
Figure 2:
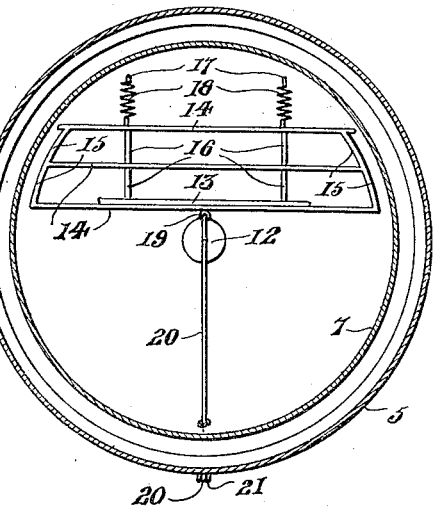
Figure 3:
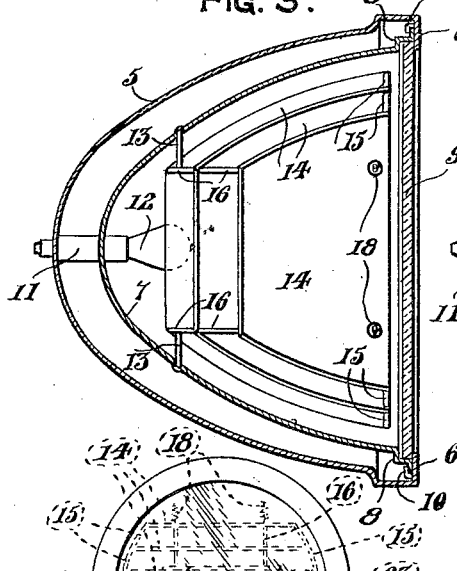
Figure 4:
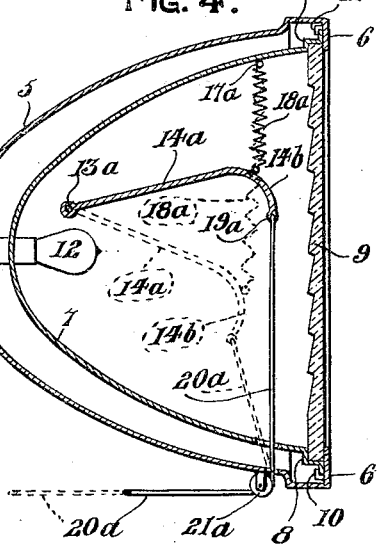
Figure 5:
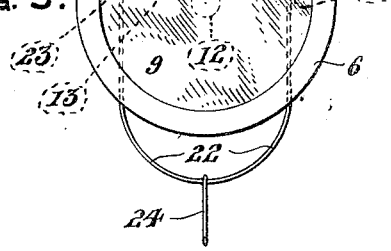

In the accompanying drawing forming a part of this specification and in which like numerals are employed to designate like parts throughout the same, Figure 1 is a vertical sectional view taken through the automobile lamp embodying this invention, Figure 2 is a transverse sectional view taken upon line II—II of Fig. 1, Figure 3 is a horizontal sectional view taken upon line III—III of Fig. 1, Figure 4 is a view similar to Fig. 1 and shows a modified form of the invention, and Figure 5 is a front elevational view of the form of the invention shown in Figs. 1 to 3 inclusive and shows a modified form of actuating means for controlling the means for directing the projected rays of light.

In the drawing, wherein for the purpose of illustration is shown a preferred embodiment of this invention, the numeral 5 designates a lamp casing which may be of any appropriate shape having an inwardly directed annular bead or flange 6 carried by its forward open end. Positioned within this lamp casing 5 is a reflector 7 that is provided at its front open end with an annular shoulder 8 which is provided for receiving the glass lens 9 which is retained in position by the inwardly directed bead or flange 6 carried by the lamp casing 5. There are further provided lugs 10 that are carried by this annular bead or flange 6 for retaining the reflector 7 in its proper position in respect to the lamp casing 5. Properly positioned within the lamp casing 5 and reflector 7 is an electric lamp socket 11 that is adapted for carrying the electric bulb 12, in the manner shown.

In the form of the invention shown in Figs 1 to 3 inclusive, there is provided a transversely extending shaft 13 that is riveted at its opposite ends into suitable openings formed in opposite sides of the reflector 7 on a plane slightly above the plane occupied by the lamp bulb 12 and in proximity thereto. Pivotally mounted upon this transverse shaft 13 is a series of three substantially flat reflector plates 14 which gradually decrease in width from the bottom to the top plate. These plates are retained in spaced relation at their front edges by means of the arcuately-shaped connector elements 15 which are suitably secured to the said plates. The rear edges of these plates are retained in their proper spaced relation to each other by means of the arcuately-shaped spacing bars 16, as shown. It will be seen by inspecting Fig. 1 that the front and rear edges of these substantially flat reflector plates are equally spaced in respect to each other. Further, that the front edges of the plates 14 are in substantial vertical alinement while the rear edges conform to the arcute shape of the spacer bars 16.

Suitably secured, as at 17, to the reflector 7 are a pair of spaced spring elements 18 that are connected at their opposite ends to the top reflector plate 14 in proximity to its front edge. It will be seen that these springs 18 will normally retain the substantially flat reflector plate 14 in the horizontally extending position shown in Figs. 1 to 3 inclusive. Secured, as by an eye bolt 19, to the lower reflector plate 14 in proximity to its front edge is a flexible cord 20 which extends downwardly through suitable apertures provided in the lower walls of the lamp casing 5 and reflector 7 to pass around the sheave 21 positioned externally of the lamp casing 5. This flexible cord is adapted for being extended to a convenient position for the operator of the vehicle.

In the modified form shown in Fig. 4, there is provided a transversely extending shaft 13ª that is secured to the walls of the reflector 7 in the manner illustrated in Fig. 3 and is adapted for pivotally supporting the reflector plate 14ª which is provided with a curved forward end portion 14ᵇ having the flexible cord 20ª suitably connected to the extreme outer edge, as at 19ª. This flexible cord 20ª extends downwardly through suitable openings provided in the lower wall of the lamp casing 5 and reflector 7 for the purpose of being passed around the sheave 21ª which is positioned exteriorly of the lower wall of the lamp casing 5. This flexible cord 20ª is intended to be extended to a convenient position to the operator of the vehicle, as suggested in connection with the flexible cord 20 shown in Figs. 1 and 2. There is further provided a coil spring 18ª which is suitably connected, as at 17ª to the top wall of the reflector 7 and is connected at its lower end to the curved portion 14ᵇ of the reflector plate 14ª.

In Fig. 5 it is intended that a modified form of pull cord be illustrated which is adapted for being employed in connection with the form of the invention shown in Figs. 1 to 3 inclusive. This modification consists of a yoke portion 22 that is formed from any suitable material, such as flexible cording, and is connected at its free ends 23 to the opposite ends of the lower plate 14 in proximity to its front edge. There is intended to be provided a pair of sheaves, not shown, positioned exteriorly of the lamp casing around which the side portions of the yoke 23 are adapted to be passed. The intermediate portion of this yoke is adapted to be connected to a flexible cord 24 which is extended to a convenient position to the operator of the vehicle.

The operation of the form of the invention shown in Figs. 1 to 3 inclusive is as follows:—

It will be seen that with the substantially flat reflector plates 14 in the position shown in Figs. 1 and 2, that light rays will be directed against the lower face of the lower plate 14 and will be reflected downwardly upon the road bed in front of the vehicle. A suitable amount of the light rays that are reflected upwardly by the lower portion of the reflector 7 will strike this lower reflector plate 14 and will be projected downwardly therefrom. It is intended that a portion of the light rays that are thrown against the rear portion of the reflector 7 slightly above the bulb 12 will be projected against the two upper reflector plates 14 and will be projected substantially forwardly upon a horizontal plane with the same. When it is desired to substantially cut off the forward projection of light, the reflector plates are actuated by the flexible cord 20 to cause the same to assume the position shown in dotted lines in Fig. 1. It will be seen that these plates have been moved directly in front of the bulb 12 and will substantially shield the same. The rays of light that strike the lower reflector plate when the same is in the dotted line position shown in Fig. 1 will be directed downwardly against the lower portion of the reflector 7 and will be allowed to project outwardly of the lamp in substantially a horizontal plane below the extreme lower edge of the reflector plate.

The operation of the modified form shown in Fig. 4 is substantially the same as that described in connection with the form shown in Figs. 1 to 3, therefore a detail description of the same is deemed unnecessary.

It is to be understood that the forms of this invention herewith shown and described are to be taken as the preferred examples of the same, and that various changes in the shape, size, and arrangement of parts may be resorted to without departing from the spirit of the invention or the scope of the subjoined claims.

Having thus described the invention, I claim:—

1. In a lamp of the type described, a lamp casing, an electric bulb positioned within said casing, a series of different sized reflector plates rigidly connected together at their corners in such a manner that the side and rear edges of each plate project outwardly beyond the same edges of the plate positioned thereabove and with the front edges of all of the plates in alinement with each other, a transversely extending shaft mounted in said casing pivotally supporting said reflector plates, and means connected to one for operating all of said plates.

2. In a lamp of the type described, a lamp casing, an electric bulb positioned within said casing, a series of reflector plates, arcuate elements rigidly connecting said plates at their corners for positioning them on parallel planes, a transverse shaft in said casing above said electric bulb connected to the plates adjacent the rear edge of the lowest plate, spring elements connecting the forward edge of the upper plate with the upper part of said casing, and means connected to the forward edge of the lowest plate extending outwardly of said casing for operating all of said plates.

In testimony whereof I affix my signature.

ARPAD GORDOS.